Sept. 2, 1952  L. O. MOTT  2,608,775
AUTOMATIC VERTICALLY PIVOTED GATE
Filed Sept. 1, 1950  3 Sheets-Sheet 1

INVENTOR.
LOAMMIA O. MOTT
BY
McMorrow, Berman + Davidson
ATTORNEYS

Sept. 2, 1952 L. O. MOTT 2,608,775
AUTOMATIC VERTICALLY PIVOTED GATE
Filed Sept. 1, 1950 3 Sheets-Sheet 2
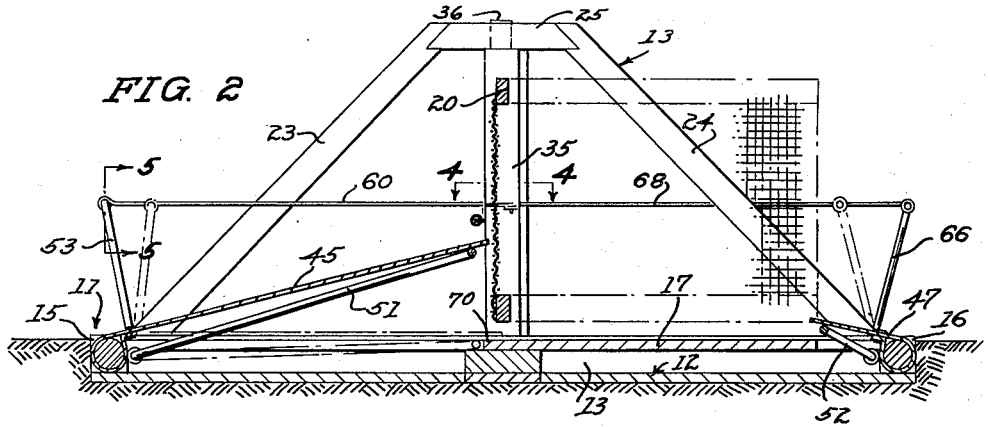
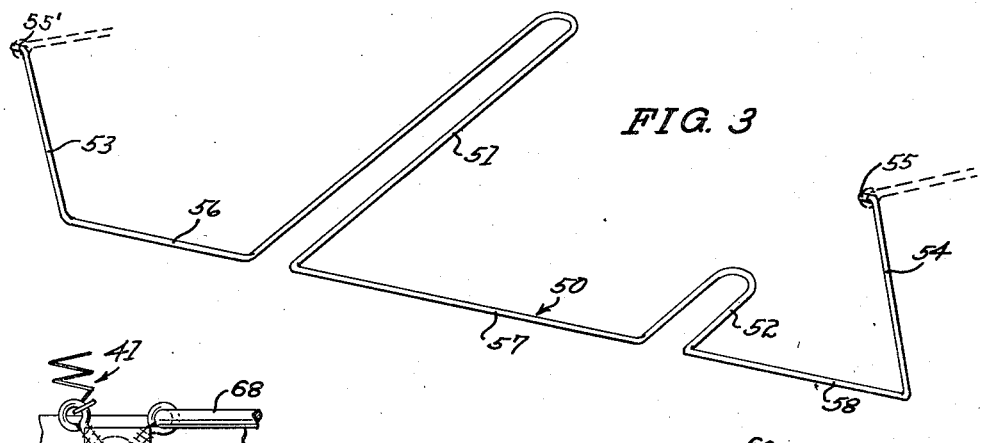
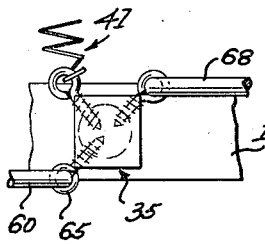
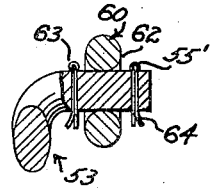
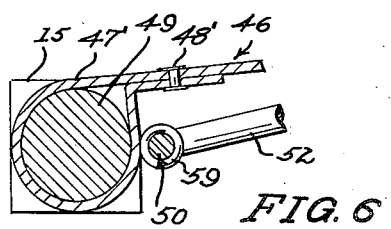
INVENTOR.
LOAMMIA O. MOTT
BY
McMorrow, Berman & Davidson
ATTORNEYS

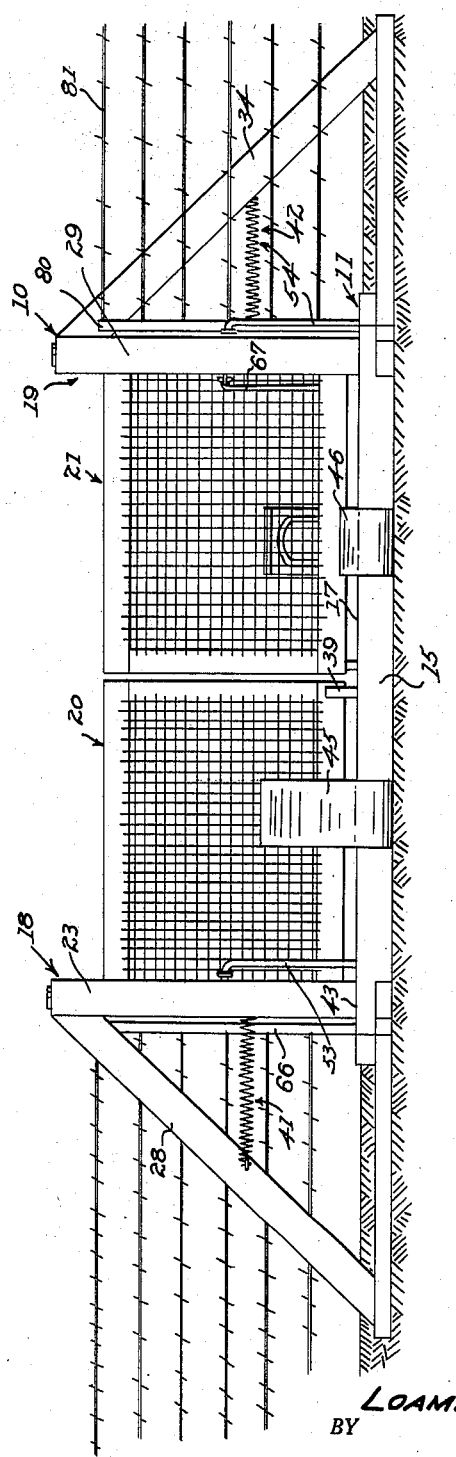

Patented Sept. 2, 1952

2,608,775

UNITED STATES PATENT OFFICE 2,608,775

AUTOMATIC VERTICALLY PIVOTED GATE

Loammia O. Mott, Bristow, Okla.

Application September 1, 1950, Serial No. 182,777

4 Claims. (Cl. 39—22)

This invention relates to a gate structure, and more particularly to a vehicle-operated gate having swinging gate sections adapted to be swung to an open position in response to the approach of a vehicle and to be restored to normally closed position after the vehicle has passed through the gate.

Another object of this invention is to provide a vehicle-operated gate which can be actuated in response to the approach of a vehicle from either side of the gate.

A further object of this invention is to provide a vehicle-operated gate which is provided with means for swinging the gate sections to an open position in response to contact with an approaching vehicle and maintaining the gate sections open for a predetermined period of time during which the vehicle may pass through the gate.

A still further object of this invention is to provide a vehicle-operated gate including a pair of swinging gate sections, which is relatively simple in construction, cheap to manufacture, and easy to install.

The above and still further objects and advantages of the present invention will become apparent upon consideration of the following detailed description of the invention when taken in conjunction with the accompanying drawings, wherein:

Figure 2 is transverse vertical section taken along the line 2—2 of Figure 1;

Figure 3 is an enlarged perspective view of a lever assembly forming a part of the vehicle-operated gate of the present invention;

Figure 4 is an enlarged fragmentary detail view taken along the line 4—4 of Figure 2;

Figure 5 is an enlarged fragmentary sectional view taken along the line 5—5 of Figure 2, with parts broken away and shown in section;

Figure 6 is an enlarged fragmentary sectional view taken along the line 6—6 of Figure 1; and Figure 7 is an elevational view of the vehicle-operated gate of the present invention, shown mounted in a gate opening provided in a fence.

Figure 1:
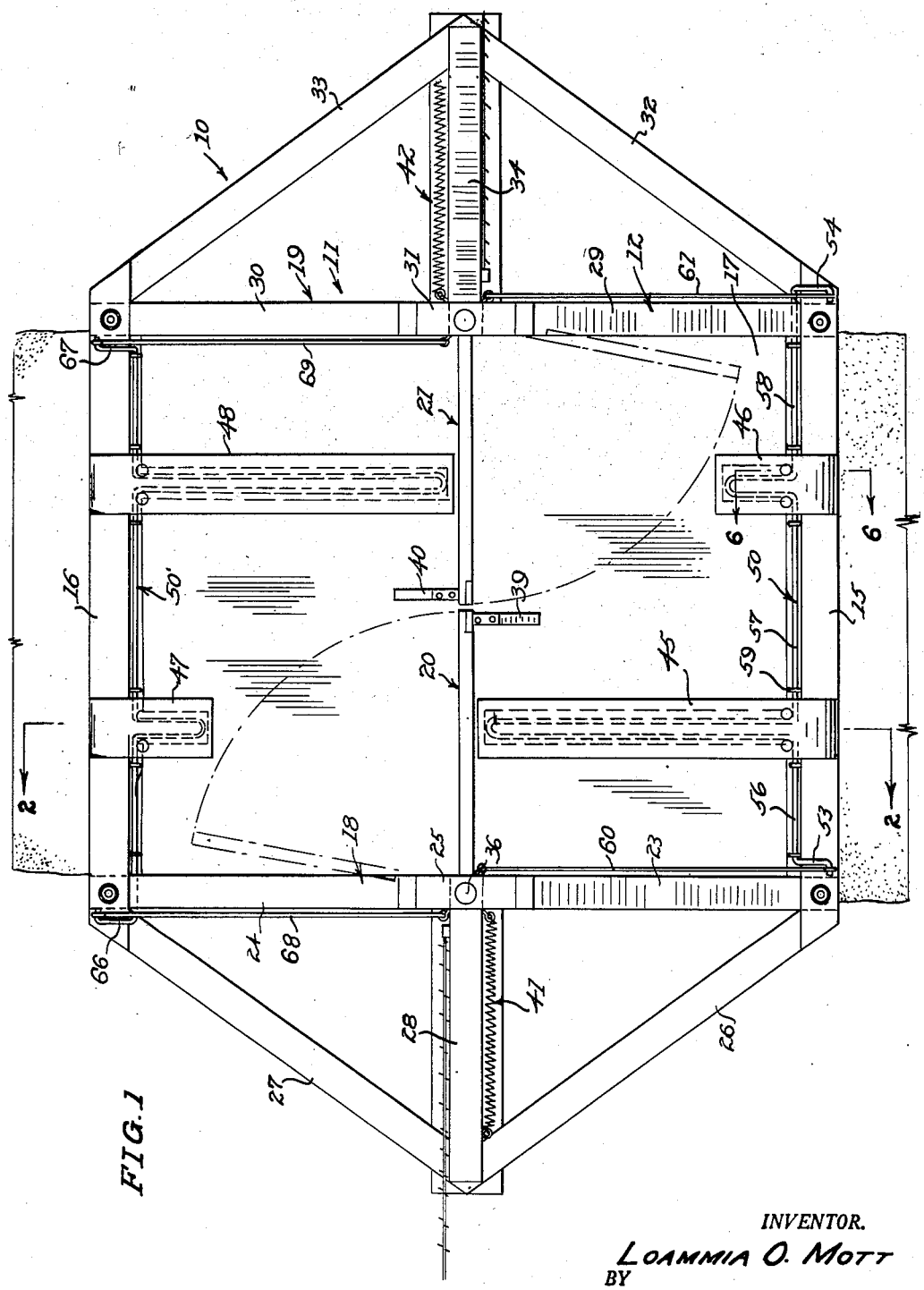
Figure 1 is a top plan view of the vehicle-operated gate including the swinging gate sections of the present invention.

Referring now more particularly to the drawings, wherein like reference numerals have been used throughout the several views to designate like parts, there is shown the vehicle-operated gate structure of the present invention, generally designated by the reference numeral 10, which comprises an open rectangular base frame 12 having side members 13 and 14 and end members 15 and 16. Supported above the base frame on the said members is the floor 17.

Mounted on the side members 13, 14 of the base frame 12 are the vertically disposed frame 18, 19 which support the swinging gate sections 20, 21. The vertically disposed frame 18 embodies a pair of upwardly converging members 23, 24 having their convergent upper ends spaced from each other and connected together by a horizontal connecting member 25. Suitable diagonal brace bars 26, 27, and 28 are connected between the vertically disposed frame 18 and the base frame 12 for imparting rigidity to the supporting structure. The vertically disposed frame 19 similarly embodies a pair of upwardly converging members 29, 30 having their upper convergent ends spaced from each other and interconnected by a horizontally disposed connecting member 31. Brace bars 32, 33, and 34 are likewise secured between the base frame 12 and the vertically disposed frame 19 to impart rigidity to the support.

Each of the gate sections 20, 21 includes a vertically disposed gate post 35 provided with reduced pintles 36 on their upper and lower ends which are journalled in seats provided on the side sills 13, 14 and on the connecting members 25, 31 of the vertically disposed frame 18, 19. The gate sections 20, 21 are normally disposed in a closed position in end-to-end relation with respect to each other and on a line midway between the ends of the floor 17 and are mounted by means of the gate posts 35 for swinging movement away from each other in opposite directions into open positions.

Positioned contiguous to the free ends of the gate sections 20, 21 and located at different sides thereof are the stop members 39, 40 which are secured to the floor 17. The stop member 39 precludes the rotary movement of the gate section 20 toward the end sill 15, while the stop member 40 precludes the rotary movement of the gate section 21 toward the end sill 16. Operatively connected to the gate sections 20, 21 are the helical springs 41, 42 for urging the gate sections into the closed position in end-to-end relation with respect to each other. As clearly shown in Figure 1, the springs 41, 42 have one end secured to the brace bars 28, 34 of the frames 18, 19, respectively, and have their opposite ends secured to eccentric portions on the related gate posts 35, the springs being in stretched condition.

Supported upon the floor 17 and operatively connected to the gate sections 20, 21 is vehicle actuated means for moving the gate sections into their open positions and for maintaining the gate sections in their open positions while a vehicle is passing through the gate. The vehicle actuated means includes relatively long treadles 45, 46 positioned transversely with respect to the gate sections 20, 21 and swingably mounted on the base frame end members 15, 16 respectively. Relatively short treadles 47, 48 are also positioned transversely with respect to the gate sections 20, 21 and are in laterally spaced relation to the long treadles and are swingably mounted on the base frame end members 15, 16 respectively. It is to be noted that the long and short treadles 45 and 47 are disposed in longitudinal alignment with each other, as are the treadles 46 and 48. The lateral spacing of the treadles 45 and 46 and 47 and 48 from each other is selected so that the wheels of a venicle can engage both sets of treadles at the same time. The long treadle 45 has its free end adjacent to and spaced from the gate section 20 and cannot possibly interfere with the latter, because the gate section 20 is prevented from swinging toward the base frame end member 15. However, the treadle 47 terminates at a point spaced beyond the arcuate traverse of the gate section 20 as the latter moves from the full line position to the broken line position illustrated in Figure 1. Since the gate section 21 swings in the opposite direction, the pedal 48 extends almost up to the gate section, while the pedal 46 is of a shorter length so that it does not interfere with the movement of the gate section 21. Since each of the pedals 45 to 48, inclusive, is mounted by a similar structure, it will suffice to describe only one in detail. In Figure 6 there is shown the mounting for the pedal 46. The adjacent end of the pedal 46 is bent to form a treansversely extending bearing 47', the free bent end of the pedal being secured upon itself by means of the rivet 48'. The adjacent portion of the end sill 15 is turned down to form a cylindrical seat transverse bearing 49 for the support thereon of the cylindrical bearing 47' of the pedal 46. Accordingly, each of the pedals 45 to 48, inclusive, is mounted for rotary movement about a horizontal axis into and out of an elevated position with respect to the floor 17 of the support 11.

Extending along and supported on the end sill 15 is a link element 50 which is operatively connected to the pedals 45, 46 for connecting the pedals together. A second link element 50' is supported along the end sill 16 and is operatively connected to the adjacent pedals 47, 48 for connecting the pedals for movement in unison. Since each of the link elements 50, 50' is of a like structure, it will suffice to describe only one in detail. The link element 50, Figure 3, embodies a first arm 51 which is adapted to underlie the pedal 45 and to be secured thereto by rivets, bolts or other suitable means. The element 50 further embodies a second arm 52 disposed in spaced parallel relation with respect to the arm 51 and adapted to underlie and be secured to the pedal 46. It is to be noted that the first arm 51 is of a length substantially equal to the length of the pedal 45 and the second arm 52 is of a length substantially equal to the pedal 46. The link element further embodies a pair of upwardly projecting connecting arms 53, 54, each of which has its free end laterally offset, as designated by the reference numeral 55. The connecting arm 53 is connected to the arm 51 by means of the web 56, the arms 51, 52 are connected together by means of the web 57, and the arm 52 is connected to the connecting arm 54 by means of the web 58. As clearly illustrated in Figure 1, the webs 56, 57 and 58 of the link element 50 are rotatably journaled on the end sill 15 by means of the spaced eyelets, generally designated by the reference numeral 59. Accordingly, upon urging the pedals 45, 46 toward the floor 17, the connecting arms 53, 54 will be pivoted toward the gate section 20, 21.

Extending between the laterally offset end 55' of the connecting arm 53 and the adjacent post 35 of the gate section 20 is a pusher rod 60. The operative connection of the pusher rod 60 to the gate section 20 is made so that upon urging the connecting arm forwardly, a counterclockwise force will be applied to the gate section 20 to urge the latter into the broken line position illustrated in Figure 1. Operatively connected between the laterally offset end 55 of the connecting arm 54 and the adjacent vertical post 35 of the gate section 21 is another pusher rod 61 which is connected in a manner wherein a counterclockwise force will be applied to the gate section 21 upon movement of the connecting arm 54 toward the gate sections. As clearly shown in Figure 5, the operative connection between the laterally offset end 55 of the connecting arm 53 and the adjacent pusher rod 60 is effected by extending the laterally projecting end through an eyelet 62 formed on the pusher rod, the laterally projecting end being held in place by means of the transversely extending pins 63, 64. As clearly shown in Figure 4, the operative connection between the gate post 35 and the adjacent pusher rod 60 is effected by means of the eyelet 65 which receives the adjacent end of the pusher rod 60.

As previously pointed out, the pedals 47, 48 are connected together by a link element 50' which is of the same structure as the link element 50 and embodies a pair of connecting arms 66, 67. The connecting arm 66 is operatively connected to the post 35 of the adjacent gate section 20 by means of the pusher rod 68 and imparts a counterlockwise force to the rotary gate post in response to the movement of the pedals 47, 48 toward the floor 17. The connection arm 67 of the link element 51 is connected to the rotary gate posts 35 of the gate section 21 by means of the pusher rod 69. From the foregoing it is readily apparent that upon urging any one of the pedals 45 to 48 inclusive, toward the floor 17, the gate sections 20, 21 will be swung into the open position illustrated in phantom in Figure 1.

As clearly shown in Figure 2, the floor 17 of the support 11 is provided with spaced longitudinally extending slots, generally designated by the reference numeral 70, for the reception of the long pedals 45, 48, the floor being provided with another pair of slots, generally designated by the reference numeral 71, for the reception of the short pedals 46, 47. Accordingly, upon the vehicle urging the pedals from the elevated position in Figure 2 toward the floor 17, the pedals will be received within the slots 70, 71 to thereby present a relatively plane surface for the vehicle to traverse. It is to be further noted, upon consulting Figure 2, that the entire support 11 is mounted in the ground in a manner wherein the floor 17 of the support 11 appears to be a continuation of the adjacent ground contours.

In actual use, the gate structure 10 of the present invention can be installed within a gate opening 80 provided in a fence 81, Figure 7. The base or support 11 is mounted in a suitable shallow recess provided in the ground surface, to thereby support the floor 17 of the support 11 in substantially coplanar relation with respect to the ground surface. Upon the vehicle engaging any one of the pedals 45, 46, 47 or 48, the gate sections 20, 21 will be swung into their open position in response to the movement of the pedals out of the elevated position illustrated in full lines in Figure 2 to the depressed position illustrated in broken lines in Figure 2. After the vehicle has caused the gate to swing to the open position, the continued contact with the vehicle wheels will maintain the gate in the open position for a predetermined period of time during which the car may pass through the gate. Upon consulting the arrangement of the pedals illustrated in Figure 1, it is readily apparent that one of the vehicle wheels will be maintained in contact with one of the pedals during the period in which the vehicle traverses the floor 17 of the support 11 of the gate structure. Accordingly, the gate will be maintained open so that the vehicle can pass therethrough. Since actuation of any one of the pedals 45 to 48, inclusive, will effect the opening of the gate, the gate can be actuated from either side.

Although only one embodiment of the gate structure of the present invention has been described, it is readily apparent that numerous modifications can be made without departing from the invention as set forth in the appended claims.

What I claim is:

1. In a vehicle actuated gate, a base frame having side members and end members, said side members including vertical frames on said side members and providing gate posts defining a gate opening therebetween, gate sections having outer ends pivoted on vertical axes on said gate posts whereby the gate sections can swing in opposite directions to open positions from closed positions wherein the gate sections are aligned with each other, means yieldingly urging said gate sections toward their closed positions, vehicle actuated means mounted on said base frame on opposite sides of the gate sections, each of said vehicle actuated means comprising a lever assembly comprising a bar extending along and journalled on the related base frame end member, a pair of treadle arms fixed on said bar, treadles overlying said treadle arms, the treadles being laterally spaced from each other so as to be engageable at the same time by the wheels on opposite sides of a vehicle, and lever arms fixed on and rising from the ends of said bar, said lever arms being disposed at an angle to said treadle arms, connecting rods having ends connected to the upper ends of said lever arms and other ends connected to eccentric portions of the said outer ends of the gate sections, the length of said connecting rods being proportioned so that in the closed positions of the gate sections the treadles are tilted upwardly above said base frame in positions to be depressed by the passage of the wheels of a vehicle thereover from either side of the gate and rotate a lever assembly so as to swing the gate sections to open position.

2. In a vehicle actuated gate, a base frame having side members and end members, said side members including stationary vertical frames on said side members and providing gate posts defining a gate opening therebetween, gate sections having outer ends pivoted on vertical axes on said gate posts whereby the gate sections can swing in opposite directions to open positions from closed positions wherein the gate sections are aligned with each other, means yieldingly urging said gate sections toward their closed positions, vehicle actuated means mounted on said base frame on opposite sides of the gate sections, each of said vehicle actuated means comprising a lever assembly comprising a bar extending along and journalled on the related base frame end member, a pair of treadle arms fixed on said bar, treadles overlying said treadle arms, the treadles being laterally spaced from each other so as to be engageable at the same time by the wheels on opposite sides of a vehicle, and lever arms fixed on and rising from the ends of said bar, said lever arms being disposed at an angle to said treadle arms, connecting rods having ends connected to the upper ends of said lever arms and other ends connected to eccentric portions of the said outer ends of the gate sections, the length of said connecting rods being proportioned so that in the closed positions of the gate sections the treadles are tilted upwardly above said base frame in positions to be depressed by the passage of the wheels of a vehicle thereover from either side of the gate and rotate a lever assembly so as to swing the gate sections to open position, one treadle of each pair being relatively short and relatively greatly spaced from the adjacent gate section and the other treadle of each pair being relatively long and having a free end positioned close to the gates adjacent thereto, the free ends of the longer treadles being thereby relatively closely longitudinally spaced from each other whereby wheels of a vehicle passing through the gate opening after having opened the gate sections by depressing a pair of treadles can depress the longer treadle of the other pair upon leaving the longer treadle of the first pair and subsequently depress the shorter treadle of the second pair so as to maintain the gate sections in open position until the vehicle wheels have passed from the treadles of the second pair.

3. In a vehicle actuated gate, a base frame having side members and end members, said side members including stationary vertical frames on said side members and providing gate posts defining a gate opening therebetween, gate sections having outer ends pivoted on vertical axes on said gate posts whereby the gate sections can swing in opposite directions to open positions from closed positions wherein the gate sections are aligned with each other, means yieldingly urging said gate sections toward their closed positions, vehicle actuated means mounted on said base frame on opposite sides of the gate sections, each of said vehicle actuated means comprising a lever assembly comprising a bar extending along and journalled on the related base frame end member, a pair of treadle arms fixed on said bar, treadles overlying said treadle arms, the treadles being laterally spaced from each other so as to be engageable at the same time by the wheels on opposite sides of a vehicle, and lever arms fixed on and rising from the ends of said bar, said lever arms being disposed at an angle to said treadle arms, connecting rods having ends connected to the upper ends of said lever arms and other ends connected to eccentric portions of the said outer ends of the gate sections, the length of said connecting rods being proportioned so that in the closed positions of the gate sections the treadles are tilted upwardly above said base frame in positions to be depressed by the passage of the wheels of a vehicle thereover from either side of the gate and rotate a lever assembly so as to swing the gate sections to open position, said treadles having ends hinged on said base frame end members and free ends located between the end members and the gate sections, said treadles resting upon the related treadle arms.

4. In a vehicle actuated gate, a base frame having side members and end members, said side members including stationary vertical frames on said side members and providing gate posts defining a gate opening therebetween, gate sections having outer ends pivoted on vertical axes on said gate posts whereby the gate sections can swing in opposite directions to open positions from closed positions wherein the gate sections are aligned with each other, means yieldingly urging said gate sections toward their closed positions, vehicle actuated means mounted on said base frame on opposite sides of the gate sections, each of said vehicle actuated means comprising a lever assembly comprising a bar extending along and journalled on the related base frame end member, a pair of treadle arms fixed on said bar, treadles overlying said treadle arms, the treadles being laterally spaced from each other so as to be engageable at the same time by the wheels on opposite sides of a vehicle, and lever arms fixed on and rising from the ends of said bar, said lever arms being disposed at an angle to said treadle arms, connecting rods having ends connected to the upper ends of said lever arms and other ends connected to eccentric portions of the said outer ends of the gate sections, the length of said connecting rods being proportioned so that in the closed positions of the gate sections the treadles are tilted upwardly above said base frame in positions to be depressed by the passage of the wheels of a vehicle thereover from either side of the gate and rotate a lever assembly so as to swing the gate sections to open position, said treadles having ends hinged on said base frame end members and free ends located between the end members and the gate sections, said treadles resting upon the related treadle arms, each pair of treadles consisting of a relatively long treadle reaching from the base frame end member into close proximity to a gate section and a relatively short treadle reaching toward the other gate section and terminating in relatively greatly spaced relation thereto.

LOAMMIA O. MOTT.

REFERENCES CITED

The following references are of record in the file of this patent:

UNITED STATES PATENTS

| Number | Name | Date |
|---|---|---|
| 1,292,248 | Cairns | Jan. 21, 1919 |
| 1,364,954 | Ruck | Jan. 11, 1921 |